Figure 1:
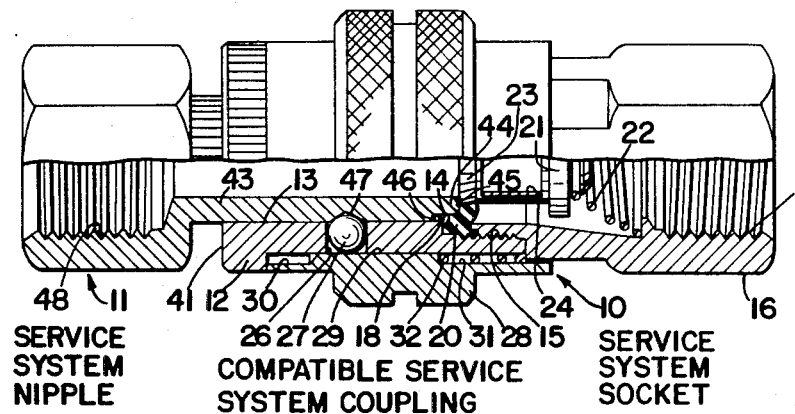

United States Patent

[11] 3,592,231

[72] Inventor Ted L. Lamb
 San Lorenzo, Calif.
[21] Appl. No. 867,414
[22] Filed Oct. 17, 1969
[45] Patented July 13, 1971
[73] Assignee Parker Hannifin Corporation
 Cleveland, Ohio
 Continuation of application Ser. No.
 630,596, Apr. 13, 1967, now abandoned.

[54] QUICK CONNECT COUPLINGS WITH SELECTIVE CONNECTION MEANS
 1 Claim, 4 Drawing Figs.
[52] U.S. Cl..................................................137/614.04,
 137/614, 251/149.6
[51] Int. Cl....................................................F16l 37/28,
 F16l 37/22

[50] Field of Search.................................... 251/149.6;
 137/614, 614.04

[56] References Cited
 UNITED STATES PATENTS
 3,170,667  2/1965  Szohatzky ..................... 251/149.6
 3,245,423  4/1966  Hansen.......................... 137/74
 3,330,529  7/1967  Hansson........................ 251/149.6

Primary Examiner—William F. O'Dea
Assistant Examiner—William H. Wright
Attorney—Diller, Brown, Ramik and Holt ABSTRACT: A pair of quick connect couplings, each coupling including a nipple and corresponding socket connectable with each other, and each nipple and socket including means to prevent connection between noncorresponding nipples and sockets.

SERVICE SYSTEM NIPPLE  COMPATIBLE SERVICE SYSTEM COUPLING  SERVICE SYSTEM SOCKET

PATENTED JUL13 1971  3,592,231

SERVICE SYSTEM NIPPLE — COMPATIBLE SERVICE SYSTEM COUPLING — SERVICE SYSTEM SOCKET

EMERGENCY SYSTEM NIPPLE — COMPATIBLE EMERGENCY SYSTEM COUPLING — EMERGENCY SYSTEM SOCKET

EMERGENCY SYSTEM NIPPLE — (INCOMPATIBLE) — SERVICE SYSTEM SOCKET

SERVICE SYSTEM NIPPLE — (INCOMPATIBLE) — EMERGENCY SYSTEM SOCKET

INVENTOR.
TED L. LAMB
BY
John N. Wolfram
ATTORNEY

QUICK CONNECT COUPLINGS WITH SELECTIVE CONNECTION MEANS

This application is a continuation of application Ser. No. 630,596 filed Apr. 13, 1967.

In many installations there are two separate fluid handling systems, each of which has a source of fluid and a place of use connectable to each other by means of quick couplings. In such installations it is frequently desirable to avoid connecting the place of use for one system to the source of fluid for the other system and vice versa.

One installation of this type is the airbrake system for automotive tractors and trailers. Such airbrake installations have a regular service system comprising a source of air under pressure on the tractor and a service braking system on the trailer, as well as an emergency source of air pressure on the tractor and an emergency brake system on the trailer. In this installation it is desirable to be able to quickly connect and disconnect the service brake system from the service supply and the emergency system from the emergency supply when the trailer is to be attached or detached from the tractor, and also to avoid inadvertent connection of the service system to the emergency supply or the emergency system to the service supply. Quick connect couplings of this general type in which nipples from two systems will connect with sockets of corresponding systems but not with sockets of noncorresponding systems have been provided in the past. However, such couplings have either employed nonannular mating devices such as lugs and recesses or keys and keyways that require angular alignment of the nipple and socket in order to connect to each other, or have employed complicated arrangements that are costly and easily subject to damage.

It is an object of this present invention to provide couplings of the type described in which the means for preventing connection between noncorresponding nipples and sockets are integral with the nipples and sockets so as to be simple and economical to produce, foolproof in nature, resistant to damage, and which are annular so as to require no angular orientation of the nipple relative to the socket when making the connection.

Figure 2:
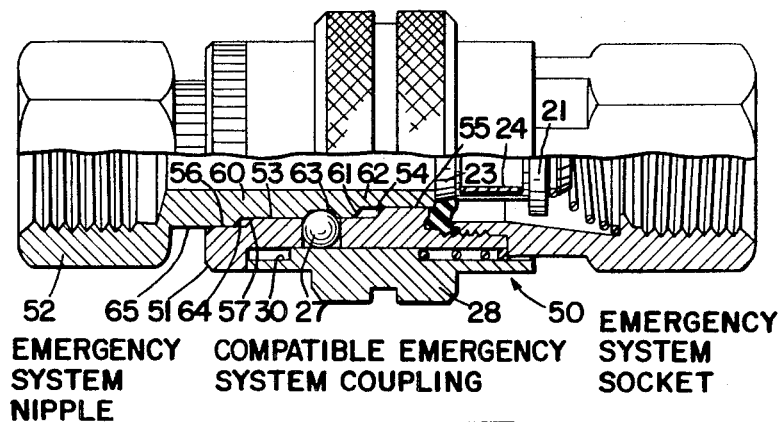
Figure 3:
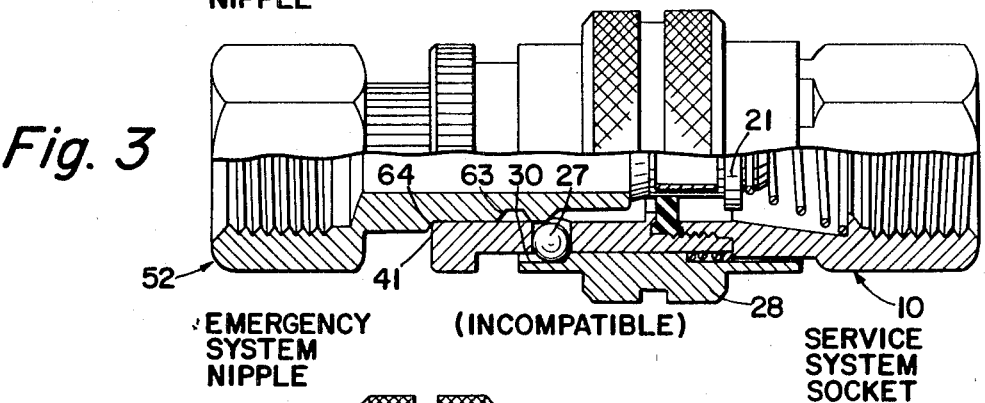
Figure 4:
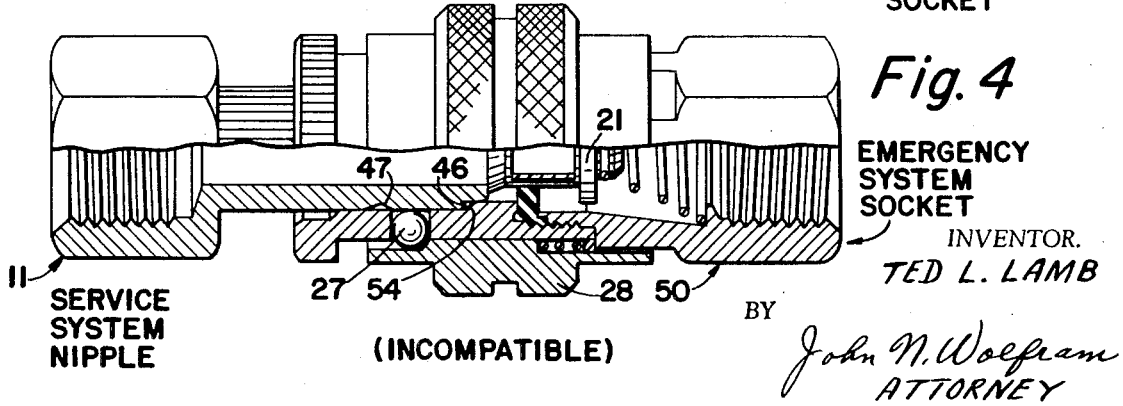

Other objects will be apparent from the following description and from the drawings in which:

FIG. 1 is a quarter section longitudinal view of a compatible nipple and socket for a service system, FIG. 2 is a quarter section of a compatible nipple and socket for an emergency system, FIG. 3 is a quarter section view showing how a nipple for the emergency system is incompatible with the socket for the service system, and FIG. 4 is a quarter section view showing how the nipple for a service system is incompatible with the socket for the emergency system.

The compatible service coupling of FIG. 1 includes a service socket 10 and a service nipple 11. Socket 10 includes a socket member 12 having a main bore 13 and a reduced bore 14 and is threadably connected as at 15 to an adapter 16 having an internal thread 17 for connection to a hoseline (not shown) leading to a source of pressurized service system air in the tractor.

Clamped between socket member 12 and adapter 16 is a rubberlike valve seat 20 against which a check valve 21 is pressed by a spring 22 to close off flow through the socket when nipple 11 is disconnected from the socket. Check valve 21 has a tubular extension 23 with lateral openings 24 therethrough to permit flow of air through the coupling when check valve 21 is off seat 20.

Socket member 12 has a series of circumferentially spaced openings 26, each containing a detent ball 27. Mounted on socket member 12 is a locking sleeve 28 that has a bore 29 and counterbore 30 and also having a counterbore 31 that receives a spring 32.

The outer end of socket member 12 constitutes a shoulder 41 that is axially spaced a given distance from detent balls 27.

Service nipple 11 has a tubular portion 43 of a diameter to closely fit within main bore 13 and a reduced cylindrical portion 44 that fits within reduced bore 14 and whose end face 45 is engageable with check valve 21 for moving the latter to open position. The rearward end of cylindrical extension 44 terminates at an annular shoulder 46.

Tubular portion 43 has an annular groove 47 that registers with and is engaged by detent balls 27 to connect the nipple to the socket. Nipple 11 at its outer end has a thread 48 for connection to a hoseline (not shown) leading to the service braking system of the trailer.

The emergency system coupling illustrated in FIG. 2 is generally similar to the service system coupling shown in FIG. 1. In this instance emergency system socket 50 has a socket member 51 that is formed somewhat differently in its interior than socket member 12 but the remaining portions and parts of emergency socket 50 are identical to those of socket 10 and have the same reference numerals. Likewise, emergency nipple 52 is generally similar to service nipple 11 except for the outer contour of the portion receivable within socket 50.

Thus, socket member 51 has a main bore 53 of the same diameter as main bore 13 but of lesser depth, terminating at an annular shoulder 54 that leads to a reduced diameter portion 55. At the outer end of main bore 53 is a counterbore 56 that terminates at a shoulder 57. Nipple 52 has a tubular portion 60 whose inner end terminates at a shoulder 61 leading to a reduced cylindrical extension 62 and which has an annular groove 63. The rearward end of tubular portion 60 terminates at a shoulder 64 leading to a larger diameter cylindrical portion 65.

Shoulder 54 is spaced a lesser axial distance from detent ball 27 than the axial distance between shoulder 46 of service nipple 11 and groove 47, and shoulder 64 of emergency nipple 52 is spaced an axial distance from groove 63 that is less than the axial distance between detent ball 27 and shoulder 41 of service socket 10.

To connect service nipple 11 with service socket 10, locking sleeve 28 is retracted against the pressure of spring 32 until counterbore 30 is opposite detent balls 27 to permit the latter to move radially outwardly. Service nipple 11 is then inserted into socket member 12 until groove 47 registers with detent balls 27. Locking sleeve 28 is then released and spring 32 moves it to the position shown in which locking sleeve bore 29 holds detent balls 27 in groove 47 to lock nipple 11 to socket 10. During insertion of nipple 11 the inner face 45 of the nipple engages check valve extension 23 to move check valve 21 to its open position away from valve seat 20. Inner end 45 also sealingly engages valve seat 20 to seal the coupling against leakage of fluid to the exterior.

To disconnect service nipple 11 from service socket 10, sleeve 28 is retracted to release detent balls 27 from groove 47 whereupon nipple 11 may then be withdrawn and check valve 21 is closed by spring 22.

The operation of the emergency system coupling shown in FIG. 2 is identical to that of the service system coupling of FIG. 1.

FIG. 3 illustrates how emergency nipple 52 is incompatible with service socket 10 so as not to be connectable therewith. Thus, upon insertion of nipple 52 into socket 10 shoulder 64 will engage socket member shoulder 41 before groove 63 is in register with detent balls 27 and prevent connection of nipple 52 to socket 10.

FIG. 4 shows how service nipple 11 cannot be connected to emergency socket 50. In this case nipple shoulder 46 engages socket shoulder 54 before groove 47 is in register with detent balls 27 to prevent connection of nipple 11 with socket 50.

Because the interfitting interior and exterior portions of socket members 12 and 51 and nipples 11 and 52 are annular, service nipple 11 and emergency nipple 52 will each connect with its corresponding socket 10 and 50 in any angular position relative thereto, thus simplifying the operation of making the connections.

Although one form of the pair of couplings has been illustrated and described, it is intended that the claims cover other detail arrangements falling within their scope.

I claim:

1. A pair of couplings comprising a first coupling that has a first socket member with a first bore of a first diameter, a first deformable valve seat element axially inward of said first bore, a first valve element movable into and out of engagement with the first valve seat element, a first locking means spaced a first distance from the first value seat element and movable into and out of said first bore, a first shoulder located axially outwardly from said first locking means a second distance and extending radially outwardly of the first bore, a first nipple having a first cylindrical portion within said first bore and having a first groove opposite said first locking means and receiving the same therein, said first nipple having a first abutment engaged with said first valve element and holding the same in open position and also sealingly engaged with said first seat element, said first nipple also having a second shoulder extending radially inwardly of the first cylindrical portion and spaced axially inward of the first groove a third distance that is shorter than said first distance, and a second coupling comprising a second socket member having a second bore of the same diameter as said first bore of said first socket member, a second deformable valve seat element axially inward of said second bore, a second valve element movable into and out of engagement with the second valve seat element, a second locking means spaced from the second valve seat element a distance equal to said first distance and movable into and out of said second bore, a third shoulder on said second socket member extending radially outwardly of the second bore and located a fourth distance axially outward from the second locking means, said fourth distance being less than said second distance, a fourth shoulder on the second socket spaced a fifth distance axially inward from the second locking means and extending radially inward of the second bore, a counterbore in said second socket extending axially outward of said third shoulder, a second nipple having a second cylindrical portion of the same diameter as the first cylindrical portion within the second bore, said second nipple having a second groove receiving said second locking means, said second nipple having a second abutment engaging the second valve element and holding the same in open position and also sealingly engaging the second valve seat element, the second nipple also having a fifth shoulder extending radially inward of the second cylindrical portion and spaced axially inward of said second locking means a sixth distance that is less than the fifth distance and also having a sixth shoulder extending radially outward of the second cylindrical portion and spaced axially outward from said second groove a seventh distance that is greater than said fourth distance whereby when said first nipple is placed in the second socket bore said second shoulder engages the fourth shoulder before said second groove is opposite the first locking means and whereby when the second nipple is placed in the first socket bore said sixth shoulder engages the first shoulder before said first groove is opposite said second locking means.